US006559438B1

(12) United States Patent
Drobot et al.

(10) Patent No.: US 6,559,438 B1
(45) Date of Patent: *May 6, 2003

(54) MULTIPLE PARALLEL SOURCE SCANNING DEVICE

(75) Inventors: Adam Thomas Drobot, Annandale, VA (US); Robert Courtney White, Fairfax, VA (US); Newell Convers Wyeth, Oakton, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/608,216

(22) Filed: Jun. 30, 2000

Related U.S. Application Data (63) Continuation of application No. 09/089,137, filed on Jun. 2, 1998, now Pat. No. 6,137,105.

(51) Int. Cl.[7] .................................................. H01J 3/14
(52) U.S. Cl. ...................................... 250/234; 250/216
(58) Field of Search ............................... 250/234, 235, 250/216, 227.11, 201.5; 385/12, 113, 115; 359/201; 369/112.27, 121, 44.37, 44.28; 347/239, 238, 255, 242

(56) References Cited

U.S. PATENT DOCUMENTS

| 3,112,360 A | 11/1963 | Gregg |
| 3,892,468 A | 7/1975 | Dunguay |
| 4,058,736 A | 11/1977 | Takahashi et al. |

(List continued on next page.)

FOREIGN PATENT DOCUMENTS

| DE | 44 01 972 A1 | 7/1995 |
| WO | WO 95/25971 | 9/1995 |

OTHER PUBLICATIONS

"Miniaturized Micro–Optical Scanners", Optical Engineering, vol. 33, No. 11, Nov. 1, 1994, pp. 3616–3623 (Motamedi, M.E. et al).

Patent Abstracts of Japan, vol. 013, No. 413 (E–820), Sep. 12, 1989 and JP 01 152683 A, Jun. 15, 1989.

Abstract of Yuji Uenishi, Hidenao Tanaka, and Hiro Ukita, "AlGaAs/GaAs micromachining for monolithic integration of optical and mechanical components", (Proc. SPIE vol. 2291, p. 82–91, Integrated Optics and Microstructures II, Massood Tabib–Azar; Dennis L. Polla; Ka–Kha Wong; Eds. Oct. 1994).

International Search Report of Oct. 4, 1999. International Application PCT/US99/12184.

Scanning Device Using Fiber Optic Bimorph (Adam Thomas Drobot, Robert Courtney White). Our reference: 00479.02150, U.S. application Ser. No. 09/089,138.

Multiple Parallel Source Scanning Device (Adam Thomas Drobot, Robert Courtney White, Newel Convers Wyeth). Our Reference: 00479.02151, U.S. application Ser. No. 09/089,137.

(List continued on next page.)

*Primary Examiner*—Que T. Le
(74) *Attorney, Agent, or Firm*—Banner & Witcoff, Ltd.

(57) ABSTRACT

An optical scanner employs a scanning head provided with an array of light-emitting apertures. According to one embodiment, for example, light is directed through waveguides or optical fibers, embedded in the scanning head, to the apertures. The head is oscillated by a micro electromechanical systems (MEMS) motor. This generates a rapidly sweeping array of light spots on the scanned surface. Light is projected to a scanned surface and collected through the same apertures. In an alternate embodiment, scanning head is provided with separate optical fibers, one for each light spot. Each fiber is vibrated by a separate MEMS motor and individually oscillated in synchrony.

17 Claims, 10 Drawing Sheets

U.S. PATENT DOCUMENTS

| | | | |
|---|---|---|---|
| 4,090,206 A | | 5/1978 | Pfeifer et al. |
| 4,135,083 A | | 1/1979 | Van Alem et al. |
| 4,193,091 A | | 3/1980 | Kleuters et al. |
| 4,234,788 A | | 11/1980 | Palmer et al. |
| 4,337,531 A | | 6/1982 | Willemsen |
| 4,482,986 A | | 11/1984 | Noda et al. |
| 4,500,204 A | | 2/1985 | Ogura |
| 4,507,765 A | | 3/1985 | Suzuki et al. |
| 4,564,268 A | | 1/1986 | Tatsuno et al. |
| 4,566,015 A | | 1/1986 | MacKenzie |
| 4,572,949 A | | 2/1986 | Bowers et al. |
| 4,737,946 A | | 4/1988 | Yamashita et al. |
| 4,744,073 A | | 5/1988 | Sugiki |
| 4,755,668 A | | 7/1988 | Davis |
| 4,763,973 A | | 8/1988 | Inoue et al. |
| 4,767,210 A | | 8/1988 | Kashyap |
| 4,771,415 A | | 9/1988 | Taki |
| 4,815,807 A | | 3/1989 | Kaneko et al. |
| 4,858,215 A | | 8/1989 | Yano et al. |
| 4,991,160 A | | 2/1991 | Premji |
| 5,001,338 A | | 3/1991 | Boero |
| 5,010,346 A | | 4/1991 | Hamilton et al. |
| 5,070,488 A | | 12/1991 | Fukushima et al. |
| 5,109,459 A | | 4/1992 | Eibert et al. |
| 5,121,449 A | | 6/1992 | Shiba et al. |
| 5,128,915 A | | 7/1992 | Yamashita et al. |
| 5,144,604 A | | 9/1992 | Sugiura |
| 5,144,616 A | | 9/1992 | Yasukawa et al. |
| 5,195,152 A | | 3/1993 | Gupta |
| 5,278,812 A | | 1/1994 | Adar et al. |
| 5,289,454 A | | 2/1994 | Mohapatra et al. |
| 5,293,291 A | | 3/1994 | Ohki et al. |
| 5,317,148 A | | 5/1994 | Gray et al. |
| 5,390,157 A | | 2/1995 | Revelli, Jr. |
| 5,416,881 A | | 5/1995 | Ikeda |
| 5,422,469 A | | 6/1995 | Bard et al. |
| 5,444,689 A | | 8/1995 | Ohki et al. |
| 5,452,382 A | | 9/1995 | Shionoya et al. |
| 5,661,591 A | | 8/1997 | Lin et al. |
| 5,727,098 A | | 3/1998 | Jacobson |
| 5,880,766 A | * | 3/1999 | Murakami et al. ........... 347/236 |
| 6,137,105 A | * | 10/2000 | Drobot et al. ............... 250/234 |
| 6,166,756 A | * | 12/2000 | White et al. ................. 347/239 |

OTHER PUBLICATIONS

Multiple Channel Scanning Device Using Optoelectronic Switching (Adam Thomas Drobot, Robert Courtney White, Newel Convers Wyeth). Our Reference: 00479.02153, U.S. application Ser. No. 09/088,782.

Method and Apparatus for Controlling the Focus of a Read/Write Head for an Optical Scanner (Edward Alan Phillips, Newel Convers Wyeth). Our Reference: 00479.02154, U.S. application Ser. No. 09/088,781.

Multiple Channel Scanning Device using Oversampling and Image Processing to Increase Throughput (Adam Thomas Drobot, Robert Courtney White, Newel Convers Wyeth, Albert Myron Green, Edward Alan Phillips). Our Reference: 00479.02155, U.S. application Ser. No. 09/088,780.

Multiple Channel Data Writing Device (Robert Courtney White, Adam Thomas Drobot, Newell Convers Wyeth, and Albert Myron Green). Our Reference: 00479.02152, U.S. application Ser. No. 09/089,136.

Abstract of D.E. Brei and J. Blechschmidt, "Design and Static Modeling of a Semicircular Polymeric Piezoelectric Microactuator", JMEMS, vol. 1, No. 3, p. 106, 1992 (Month Unknown).

Abstract of K. Minami, S.Kawamura, and M. Essahi, "Fabrication of Distributed Electrostatic Micro Actuator (DEMA)", JMEMS, vol. 2, No. 3, p. 121 et. seq., Sep. 1993.

Abstract of Q. Meng, M. Mehregany, and R.L. Mullen, "Theoretical Modeling of Microfabriated Beams with Elastically Restrained Supports", JMEMS, vol. 2, No. 3, p. 128 et. seq., Sep. 1993.

Abstract of M. Ataka, A. Omodaka, N. Takeshima, and H. Fujita, "Fabrication and Operation of Polyimide Bimorph Actuators for a Ciliary Motion System", JMEMS, vol. 2, No. 4, p. 146, 1993 Month Unknown.

Abstract of J.G.Smits and A. Ballato, "Dynamic Admittance Matrix of Piezoelectric Cantilever Bi–morphs", JMEMS, vol. 3, No. 3, p. 105 et. seq., Sep. 1994.

Abstract of J.W. Judy, R.S. Muller, and H.H. Zappe, "Magnetic Microactuation of Polysilicon Flexure Structures", JMEMS, vol. 4, No. 4, p. 162, 1994 Month Unknown.

Abstract of T.S. Low and W. Guo, "Modeling of a Three–Layer Piezoelectric Bimorph Beam with Hysteresis", JMEMS, vol. 4, No. 4, p. 230, Dec. 1995.

* cited by examiner

MULTIPLE PARALLEL SOURCE SCANNING DEVICE

This is a continuation of Ser. No. 09/089,137 filed Jun. 2, 1998, now U.S. Pat. No. 6,137,105.

BACKGROUND OF THE INVENTION

Figure 1:
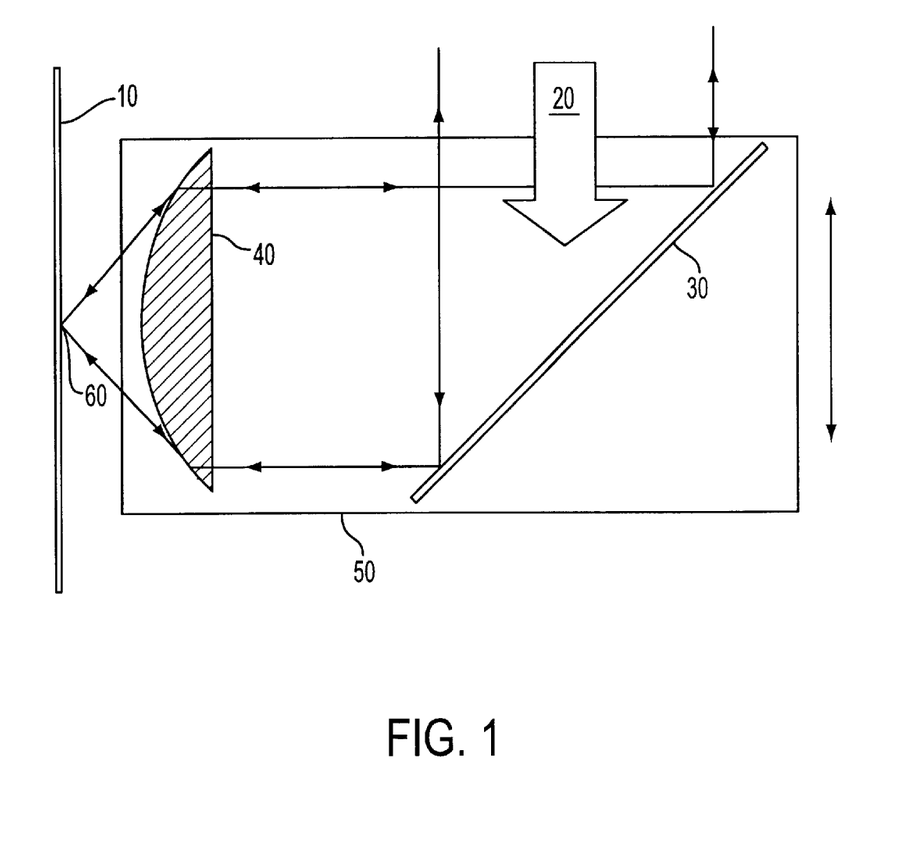
FIG. 1 is a ray trace diagram showing a scanning device according to the prior art.

Various optical scanners are known for such applications as data storage, bar code reading, image scanning (surface definition, surface characterization, robotic vision), and lidar (light detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector (not shown). To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, a lens driven galvanometrically, or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally associated with high costs for mass manufacture, assembly and alignment.

TABLE 1

Performance of Conventional Beam Deflectors for Optical Scanning.

| Parameter | Polygonal Mirrors | Galvano-Driven Mirrors | Halogons (Transmission) | Acousto-Optic Deflectors |
|---|---|---|---|---|
| wavefront distortion | λ/8 0.55 μm | λ/8 at 0.55 μm | λ/6 at 0.55 μm | λ/2 at 0.55 μm |
| area resolution (spot-widths/sec) | 25,000 (scan lens limited) | 25,000 (scan lens limited) | 25,000 (scan lens limited) | 1,000 (scan lens limited) |
| cross-axis error | 10 arc sec (uncorrected) | 1–2 arc sec (uncorrected) | 10 arc sec | 0 |
| speed (spot widths/sec) | $1 \times 10^8$ | $2 \times 10^6$ | $2 \times 10^7$ | $2.8 \times 10^7$ |
| bandwidth | 0.3–20 μm | 0.3–20 μm | Monochromatic | monochromatic |
| scan efficiency | 80–100% | 65–90% | 90% | 60–80% |

(from the Photonics Design and Applications Handbook 1993, Laurin Publishing Co., Inc., p. H-449)

The performance parameters listed in Table 1 assume different levels of importance depending on the optical scanning application For raster scanning to cover extended surface areas, the emphasis is on speed, area resolution, and scan efficiency. Wide bandwidth is needed if the surface is to be color scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (bit cells) in which some optical property has been set at one of two or more values to represent digital information. Commercial read/write heads scan the media with a diffraction-limited spot, typically produced by focusing a collimated laser beam with fast objective lens system as shown in FIG. 1. A fast objective lens, one with a high numerical aperture, achieves a small spot size by reducing Fraunhofer-type diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit cells must be followed by the spot with sufficient precision to avoid missing any bit cells. The fine tracking is achieved by servo mechanisms moving the objective lens relative to the head assembly. An auto-focus servo system is also necessary to maintain the diffraction limited spot size because the medium motion inevitably causes some change in the mean/medium separation with time. Proper focus adjustment is possible because the medium is flat and smooth. Such a surface reflects incident light in well-defined directions like a mirror. Light reflected from the medium is collected by focusing optics and sent back along the collimated beam path for detection.

Scanning by several spots simultaneously is used to achieve high data rates through parallelism in one known system called the CREO® optical tape system. One scanning device that avoids reliance on discrete optical elements to achieve scanning is described in U.S. Pat. No. 4,234,788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber ss the fiber is forced back and forth repeatedly. To make the fiber wiggle back and forth an alternating electric field, generally perpendicular to the axis of the fiber, is generated. The fiber is coated with a metallic film. A charge is stored on the film, especially near the tip, by forming a capacitance with a metallized plate oriented perpendicularly to the fiber axis (optically at least partly transparent). The stored charge makes the fiber responsive to the electric field.

A drawback of this device is the limit on the speeds with which the fiber can be made to oscillate. The device requires a series of elements to move the fiber: an external field-generating structure, a DC voltage source to place charge on the fiber coating, an AC source to generate the external field. Another drawback of this prior art mechanism is the inherent problem of stress fractures in the fiber optics. Bending the fiber repeatedly places serious demands on the materials. Problems can arise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very close to the scanned surface as may be desired for certain optical configurations.

Another prior art scanning device is described in U.S. Pat. No. 5,422,469. This patent specification describes a number of different devices to oscillate the end of an optical light guide or optical fiber. One embodiment employs a piezo-electric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezo-electric bimorph. However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

U.S. Pat. No. 3,892,468 describes an optical scanner that employs a large number of fibers to can a surface. Light from a pulsed laser is directed to a series of beam splitters with each arranged along the path of the beam to direct a portion of the beam to a respective input end of a fiber optic light guide. Each fiber is a different length, so that each takes a different amount of time to emit its respective portion of the pulse at its output end. The output end of the longest fiber is located at one end of an array that is imaged on a target surface by a focusing lens. When a pulse of light hits the beam splitters, the portion of the pulse directed to the shortest fiber by its respective beam splitter takes the shortest time to reach the output end and be imaged on the target. The second portion is emitted by the second-shortest fiber in turn. Because the output ends of the fibers are arranged progressively in a line with the shortest fiber at one end and the longest at the other end, the pulse produces a spatial and temporal scan across the target. Although this device has the advantages of requiring no movable parts to perform the scanning, the beam splitters cut the pulsed lasers beam intensity down substantially. Also, each fiber is used for scanning only once during each laser pulse.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

An optical scanner employs a scanning head provided with an array of light-emitting apertures. According to one embodiment, for example, light is directed through waveguides or optical fibers, embedded in the scanning head, to the apertures. The head is oscillated by a micro electro-mechanical systems (MEMS) motor. This generates a rapidly sweeping array of light spots on the scanned surface. Light is projected to a scanned surface and collected through the same apertures. In one alternate embodiment described herein with various others, the scanning head is provided with separate optical fibers, one for each light spot. Each fiber is vibrated by a separate MEMS motor and individually oscillated in synchrony.

According to an embodiment, the invention provides a scanning device for scanning a target surface. The device includes a light-emitting base element with at least one internal light source and an array of output apertures from which light from the light source is emitted. The base element is movable with respect to a media element. The light-emitting base element is positioned with respect to the target surface so that light spots corresponding to the array of output apertures are projected onto the target surface. A motor is connected to drive the base element such that the output apertures are oscillated along a direction parallel to a line defined by an arrangement of the array. The magnitude of the oscillation is such that adjacent light spots sweep separate or slightly overlapping regions of the target surface. According to a variant, the light spots are formed by an optical focusing element arranged between the array of output apertures and the target surface which focuses light from the array of output apertures onto the surface. In one variation, the focusing element has an approximately 1:1 magnification. An embodiment may include a light detector positioned to detect light from the array of apertures and returned from the target surface. Another may provide that the base element include a plurality of optical fibers, each connected to a respective output aperture. Another variant provides that the base element include optical fibers, each connected to a respective output aperture. The base element also includes multiple detectors, each connected to receive light emitted by the respective output aperture and returned from the target surface through the output aperture. A further feature provides that each of the detectors is connected to a respective optical fiber by an optical directional coupler in such a way that the light returned through the respective output aperture is directed to the detector. Still another variant includes an optical focusing element arranged between the output apertures and the target surface to focus light onto the surface. In still another variation, an optical focusing element is arranged between the output apertures and the target surface to focus light from the output apertures onto the surface while the optical focusing element and the base element are fixedly interconnected so that the optical focusing element is oscillated with the base element by the motor.

According to another embodiment of the invention, the invention provides a scanning device for scanning a target surface. The device has a light-emitting base element with at least one internal light source and an array of output apertures from which light from the light source is emitted. An optical focusing element is arranged between the array of output apertures and the target surface to focus light from the array of output apertures onto the surface. This images a corresponding array of light spots onto the target surface. A motor is connected to drive at least one of the base element and the optical focusing element relative to the target surface so that the array of light spots is oscillated along a direction parallel to a line defined by an arrangement of the array of light spots. The magnitude of the oscillation is such that adjacent light spots sweep separate or slightly overlapping regions of the target surface. A variant provides that the focusing element has an approximately 1:1 magnification. Another variant provides a light detector positioned to detect light from the apertures that is returned from the target surface. Respective optical directional couplers may be used to direct light returned through the respective output aperture to each of the detectors. The optical focusing element and the base element may be fixedly interconnected such that the optical focusing element is oscillated with the base element by the motor.

According to still another embodiment, the invention provides a scanning device for scanning a target surface. The device has a base with at least one light source optically connected by a series of light guides to an array of output apertures. An optical focusing element arranged between the array of output apertures and the target surface focuses light from the output apertures onto the surface. This forms a corresponding array of light spots on the target surface. A motor is connected to drive at least one of the base element and the optical focusing element relative to the target surface such that the array of light spots is oscillated to sweep an area of the target surface defined by an arrangement of the array of light spots, a movement of the base relative to the target surface, and an oscillation of the array of light spots. Optionally, the magnitude of the oscillation is such that adjacent light spots sweep separate or partly overlapping regions of the target surface. Also optionally, the base has a plurality of detectors, each connected to receive light emitted by a respective output aperture and returned from the target surface through the output aperture.

A laser source, which could be fundamental mode or multimode, applies light to the respective base ends of light guides arranged in an array. Light is emitted from light output apertures from a base in which the light guides are formed. The light guides could be optical fibers. The arrangement of output apertures produces a straight-line array of points of light on a target surface when the array is positioned in the image plane of focusing optics and the target positioned in the focal plane. A fast lens system is preferably used to focus the light to produce diffraction-limited spots on the target surface.

The light guides are oscillated in a direction substantially parallel to the line defined by the arrangement of the light-output apertures of the array. The magnitude of the oscillation may be such that the light spots traverse overlapping tracks on the scanned medium or the magnitude may be less than that. The array and the medium are connected in such a way as to cause the medium to move relative to the array in a direction at least partly perpendicular to the line defined by the array of output apertures. Thus, as the medium moves, the spots sweep across the surface, thereby sweeping a swath (scanning area) across it.

The light guides can be embedded in cantilever-mounted bimorphs that bend in response to an electrical stimulus. All of the bimorphs, being excited by the same applied voltage, may be caused to oscillate together in phase. Alternatively, the entire array may be oscillated as a single unit while holding the focusing optics fixed in position relative to the scanned surface. Two other alternatives are to oscillate the focusing optics with the array and oscillating only the optics. Moving only the optics reduces the displacement required of the motor by a factor of 2, assuming a magnification of 1:1. It is also possible, by positioning the output apertures very close to the surface to be scanned, to eliminate the need for focusing optics.

A beam splitter may be used along the return path of the light to collect reflected light and send it along a final leg of a return path so that the return light can be directed to a detector rather than back to the laser source. Optimally, the effective magnification of the focusing optics is 1:1. This is a result of the need for a high numerical aperture at the output tip and the desire to minimize off-axis displacement of the bimorph tip (to minimize axial displacement when bent) or to minimize the motion of the oscillating array (to reduce acceleration forces).

The array may be oscillated by MEMS technology motors. This class of device can produce the motion required at frequencies up to 100 kHz and above.

DETAILED DESCRIPTION

Figure 2A:
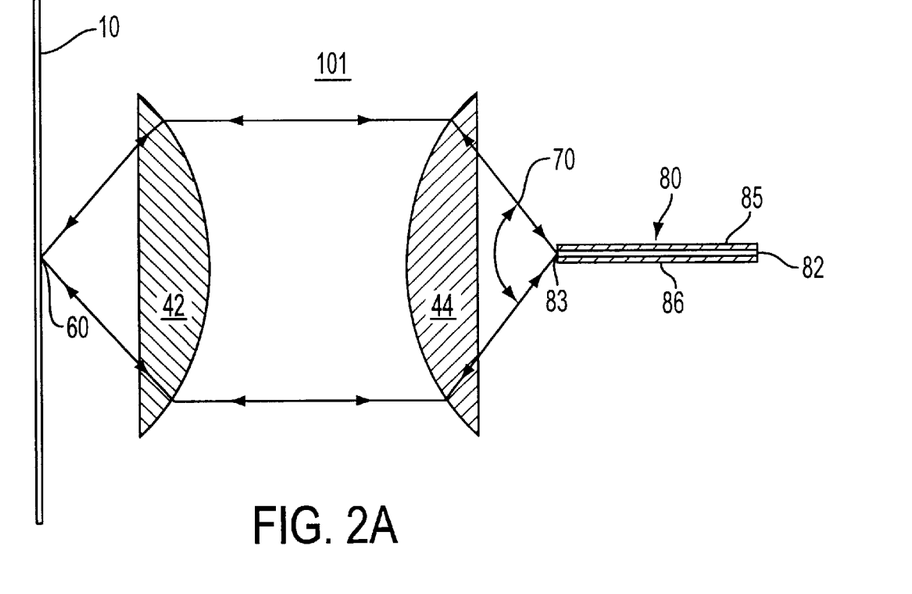
FIG. 2A is a ray trace diagram showing cantilever bimorph emitting light which is imaged onto a target surface and receiving return light from the target surface.

Referring to FIG. 2A, a scanning device 101 according to an embodiment of the invention employs a laser source (not shown in FIG. 2A but shown at 64 in FIG. 2B), which could be fundamental mode or multimode. Light from the laser source is fed into one end of a wave-guide, in the present embodiment, an optical fiber 82 embedded between two pieces of piezoelectric material 85 and 86 forming a bimorph/fiber element 80. The tip 83, of optical fiber 82 is constructed to cause light emitted from it to diverge with a high numerical aperture ratio; of the order of 0.5. A fast lens system 46, with lenses 42 and 44, focuses light from the tip to a diffraction-limited spot on a scanned surface 10. Fiber tip 83 is positioned so that it is substantially in the focal plane that is precisely imaged by lens system 46 onto surface 10 to form a light spot 60. The effective size of the light source is the Gaussian beam waist of the fundamental mode within the fiber tip. Vibration of fiber 1 is achieved by embedding it in a cantilever bimorph 80 designed to bend in response to an applied stimulus such as an electric field. The piezoelectric bimorph 80 has two flat strips of piezoelectric material 85 and 86 joined lengthwise. Electrodes are attached in such a way as to induce elongation of one strip and contraction of the opposite strip when an electric field is applied. This action results in a bending motion of the unitary fiber/bimorph element 80. When the field is reversed, the bending motion is reversed in direction, causing a vibrating motion when an AC voltage is applied continuously. A 4×4 matrix relates the driving parameters to the response parameters. As bimorph 7 vibrates, the spot at the tip of fiber 1 is swept in an arc-shaped path.

Figure 2B:
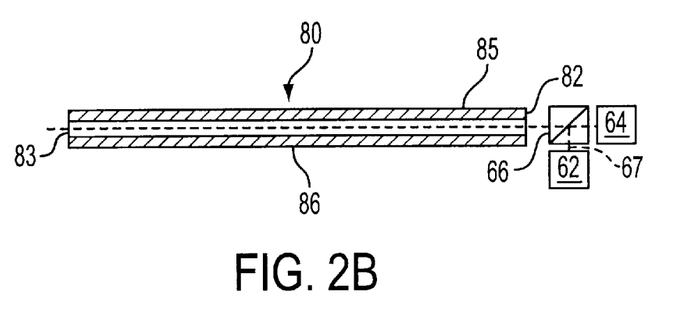
FIG. 2B is a section view of the bimorph of FIG. 2A showing, schematically, a laser source and a detector.

Referring now also to FIG. 2B, in using scanning device 101 to read information from scanned surface 10, reflected light from spot 60 is focused by fast lens system 46 back onto the tip of fiber/bimorph element 80. Any stray reflected light coming from areas not precisely aligned with spot 60 is rejected because the tip of fiber 82 acts as an aperture stop. A beam splitter 66 may be used along the return path to collect reflected light and send it along a final leg of a return path 67 so that the return light can be directed to a detector 62 rather than back to the laser source 64.

Figure 3:
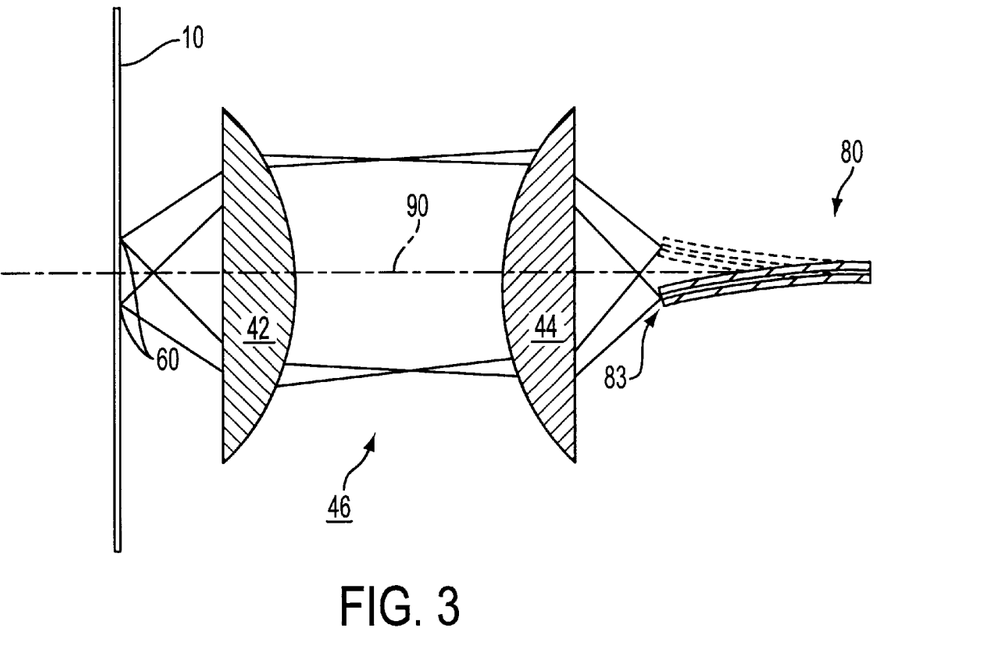
FIG. 3 is a ray trace diagram showing extreme positions of a cantilever mounted bimorph of FIG. 2A.

Referring to FIG. 3, optimally, the effective magnification of lens system 3 is 1:1. First, it is desirable to insure that the numerical aperture at the output end be as high as possible to limit Fraunhofer diffraction thereby maximizing the resolution of the spot-projection. Thus a high numerical aperture at the output (scanned surface) end of the focusing optics is desirable. At the input (laser) end of the focusing optics, it is desirable to minimize the off-axis displacement of the light source. That is, it may be desirable to limit the sweep of the tip of the fiber/bimorph element 80 to limit strain on the element 80 and to limit the (longitudinal) displacement of the tip 83 relative to the plane of points that are focused onto the scanned surface 10 (a plane that is perpendicular to the optical axis 90) so the spot 60 is not out of focus at the extremes of the sweep. On the other hand it is desirable to maximize the sweep of the projected spot 60. A narrow sweep of the fiber/bimorph 80 can translate into a large sweep of the spot 60 if the focusing optics have high magnification and high quality optics. This translates to fast optics and a high numerical aperture at the input of the bimorph. Thus, according to the preferred embodiment, the focusing optics are designed with as high a numerical aperture as practical at the input and output ends and thus, with approximately 1:1 magnification. In the preferred embodiment, taking into account practical issues of real-world optics, a numerical aperture of approximately 0.5 is about as high as can be achieved.

With the optical properties discussed above, the focused laser spot scans over the surface when the fiber tip is moved relative to the optical axis as shown in FIG. 3. In a nominal lens system design with 1:1 magnification, the spot moves along the scanned surface the same distance that the fiber tip 83 moves perpendicular to the optical axis. Of course, since the fiber is bending, the path swept by the tip is arc-shaped so that the tip 83 does not remain in the plane that is focused on the scanned surface. Error in the focus of the optics can be minimized if the amplitude of the reciprocating movement is kept small. In this invention, bimorph 80 is vibrated to produce a regular oscillatory motion of the fiber tip 83 and the consequent scanning motion of the focused light spot across the surface.

Figure 4:
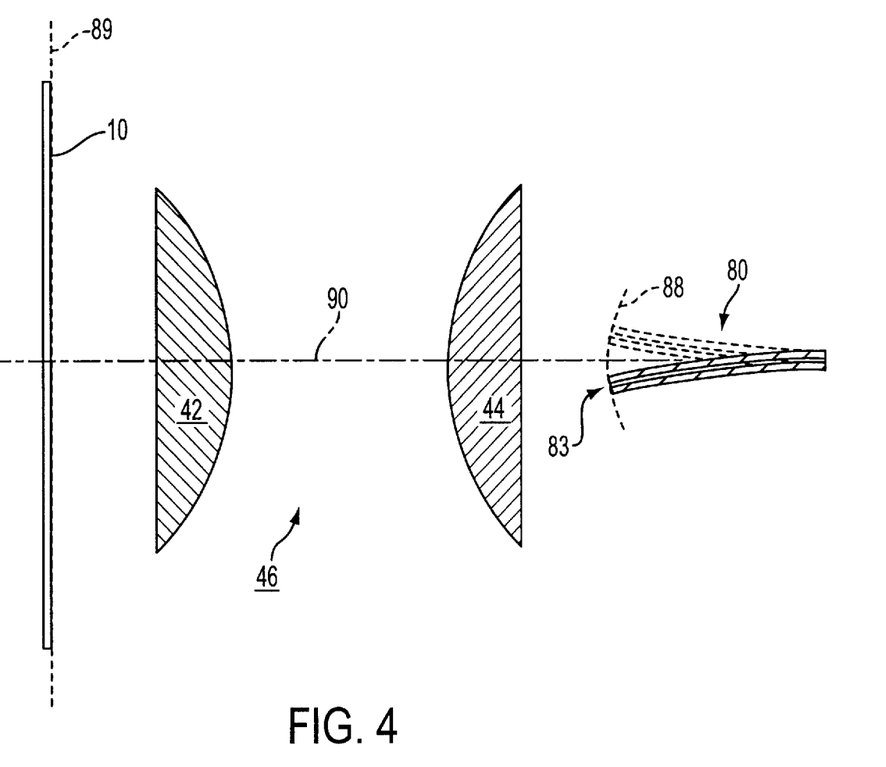
FIG. 4 is a diagram illustrating a path followed by a tip of the bimorph of FIG. 2A as the bimorph bends.

Referring to FIG. 4, focusing error caused by the arc-shaped sweep of the fiber tip may be ameliorated not only by reducing the amplitude of the vibration of fiber/bimorph element 80, but also by the use of certain non-conventional optics. Specifically, focusing optics may be shaped to image the locus of points defined by the curved path of sweep 88 of the fiber/bimorph element 80 tip 83 onto the plane 89 of the scanned surface 10. That is, the optics are designed such that the tip 83 remains in focus at all cross-axis positions of tip 83.

Note that the lens system could be made from a single holographic element (not shown).

Figure 5:
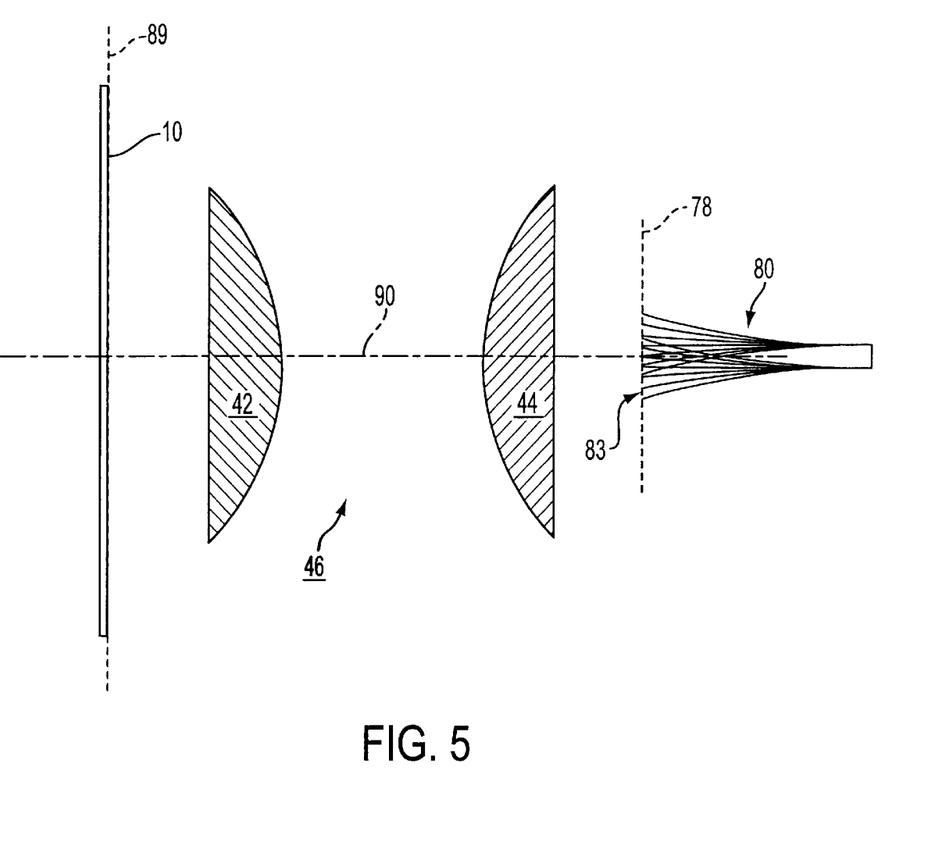
FIG. 5 is a diagram illustrating a path followed by a tip of an alternate embodiment of a bimorph which is constructed or excited such that the tip follows a straight path.

Referring to FIG. 5, still another way to ameliorate focusing error caused by the tendency of the fiber/bimorph element 80 to move axially as it bends away from the optical axis is to drive it in such a way that the tip 83 actually remains in a plane 78. This can be done in two ways or by a combination of the two. The first way is to apply voltage to the piezoelectric elements such that the elements are extended as the tip moves away from the optical axis and contracted as the tip moves toward the axis. That is, the bimorph is stretched as it moves away from the axis and compressed as it moves toward the axis. This is done by insuring the driving voltage differential causes the bending of the fiber/bimorph element and the net driving voltage produces elongation and contraction. Thus, the driving AC voltages applied to the two piezoelectric layers is generated so that the difference between the instantaneous voltages is an oscillating function that is symmetric about zero voltage difference. The other way is to manufacture the bimorph/fiber element of composite materials stressed such that when the fiber/bimorph element 80 bends, it simultaneously stretches. Thus, the tip 83 tends to remain in a plane rather than sweeping an arc.

Figure 6:
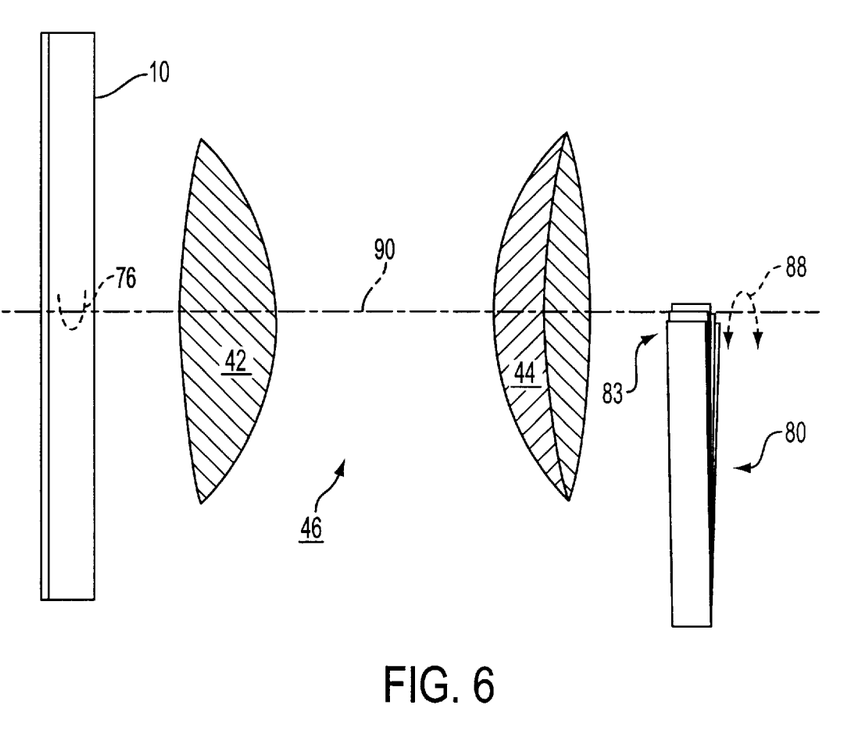
FIG. 6 is a diagram showing an alternative way of cantilever-mounting a bimorph to achieve constant axial position of the tip during bending.

Referring to FIG. 6, still another way to ameliorate the focusing error caused by bending is to position the fiber/bimorph element 80 such that the arc 88 of the sweep of tip 83 lies in a plane perpendicular to the optical axis. The spots then scan a curved path 76 on the scanned surface 10. It is desirable for the surface to be written and read with the same arc-shaped sweep so that the data cells are aligned properly for both operations. In the arrangement of FIG. 6, light must exit the fiber tip 83 perpendicularly to the fiber axis. This may accomplished for example using mirrors, lenses, etc. at the fiber tip 83.

Figure 7:
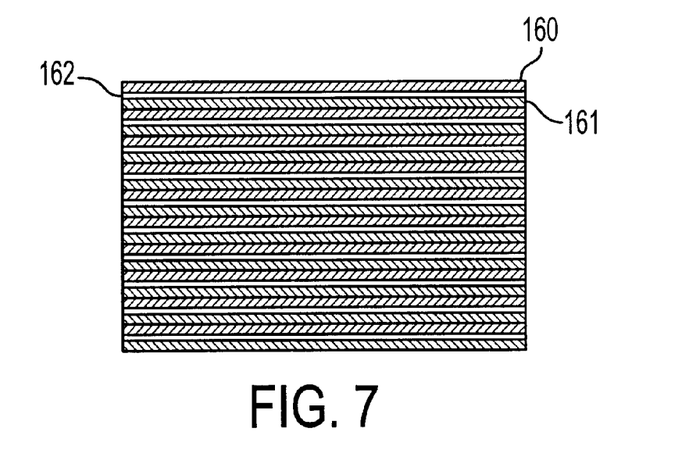
FIG. 7 is a top view of a step in the fabrication of a first embodiment of bimorphs using photo-lithographic techniques.
Figure 8:
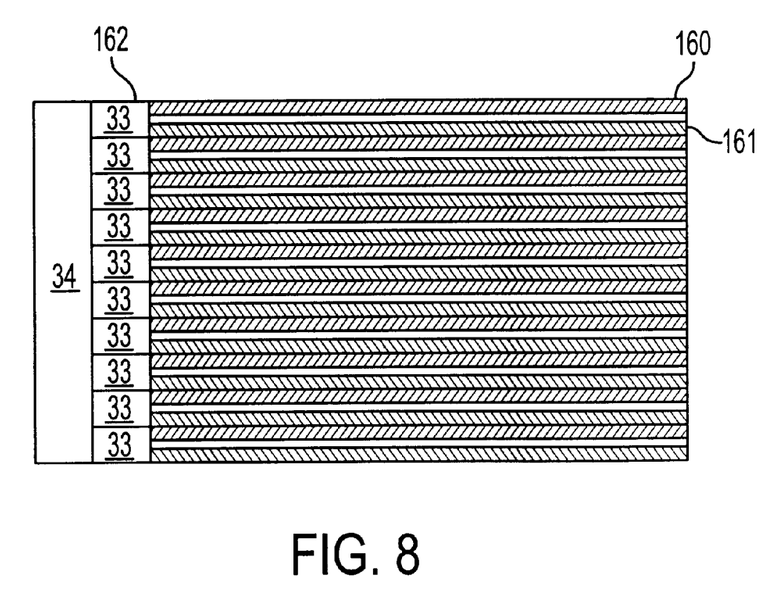
FIG. 8 is a top view of a step in the fabrication of a second embodiment of bimorphs using photo-lithographic techniques, where the resulting bimorphs include integral laser light sources.

Referring to FIG. 7, another embodiment of the invention lends itself to production using photo-lithographic techniques applied to the production of semiconductors and optical chips. A light guide 162 may be formed within and between two layers of piezo-electric material 160 and 161. Electrodes can be formed on appropriate portions of layers 160 and 161. Such a technique can be employed to manufacture fiber/bimorph element 80 in a few steps to produce large numbers. The resulting bimorph 80 with light-guide 162 embedded inside can be coupled to laser 166 by a pig-tail connection using a fiber (not shown), butt-coupling lasers 33 to the light-guides, or fabricating the lasers or laser/detectors 33 right on the substrate 34 on which the fiber/bimorph 80 itself is fabricated as shown in FIG. 8.

Figure 9:
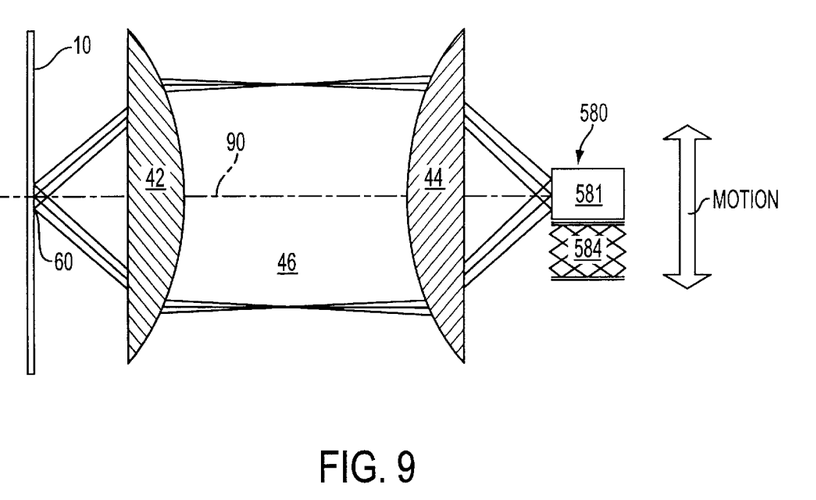
FIG. 9 is a ray trace diagram showing a multiple channel scanning head according an embodiment of the invention, where the imaging optics are fixed and the scanning head is oscillated by a MEMS motor to scan a region of a target surface.

Referring to FIG. 9, in an embodiment of the invention, several separate light guides 182 are assembled into a single array 180 supported on a stage 181 that is oscillated by a motor 184 based on microelectromechanical systems (MEMS) technology. Preferably the light guide array is an array of optical fibers. A scanning motion of multiple spots 60 can be obtained with this arrangement. The multiple focused spots 60 will scan over the surface 10 when the light guide array 180 is oscillated relative to the optical axis 90 of the lens system. In the embodiment of FIG. 9, the lens system 46 is held fixed and the stage 181 is oscillated. In a nominal lens system with 1:1 magnification, the spots move along the surface 10 the same distance as the stage 181.

Figure 10:
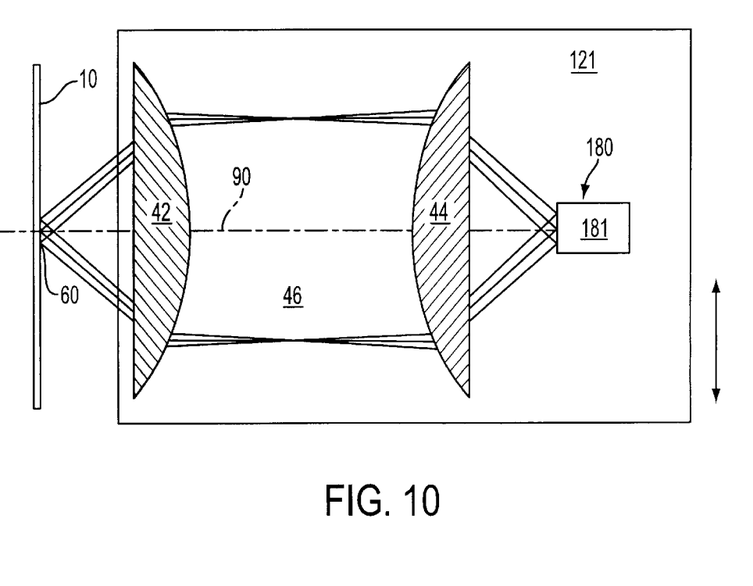
FIG. 10 is a ray trace diagram showing a multiple channel scanning head according an embodiment of the invention, where the imaging optics and scanning head are fixedly interconnected and oscillated as a unit by a MEMS motor to scan a region of a target surface.
Figure 11:
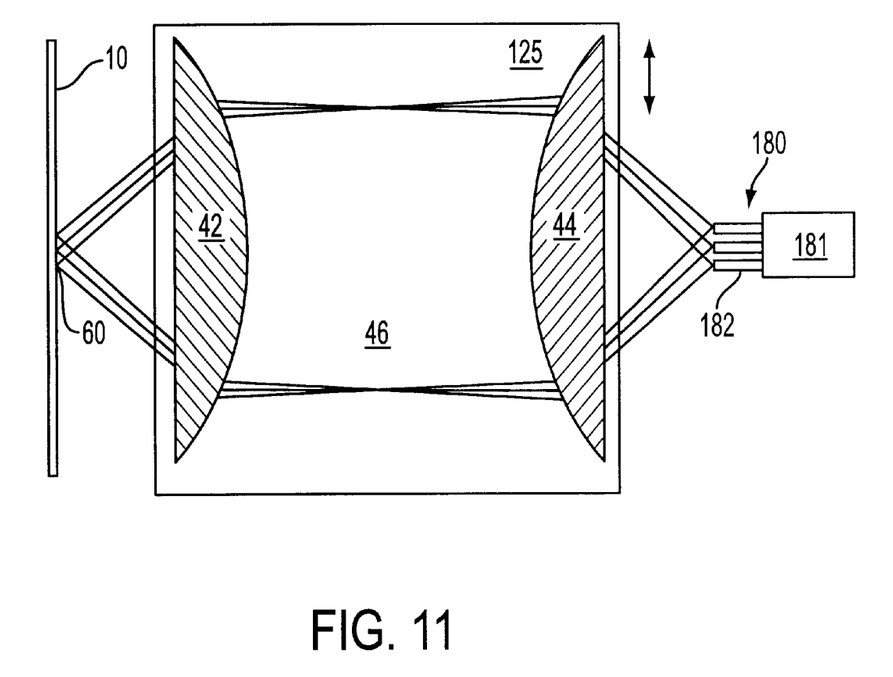
FIG. 11 is a ray trace diagram showing a multiple channel scanning head according an embodiment of the invention, where the imaging optics are oscillated as a unit by a MEMS motor to scan a region of a target surface.

Referring to FIG. 10, in an alternative embodiment, similar to that of FIG. 9, the focusing optics 46, as well as the light guide array 180, is oscillated. The focusing optics 46 and the light guide array are supported on a large stage 121 which is oscillated by a motor (not shown). Referring to FIG. 11, in still another embodiment, lens system 46 is supported on stage 125 which is oscillated relative to both the scanned surface 10 and the light guide array 180. In this case, the focused spots 60 move along the surface twice as far as the stage 125 for a nominal lens system providing 1:1 magnification.

Figure 12:
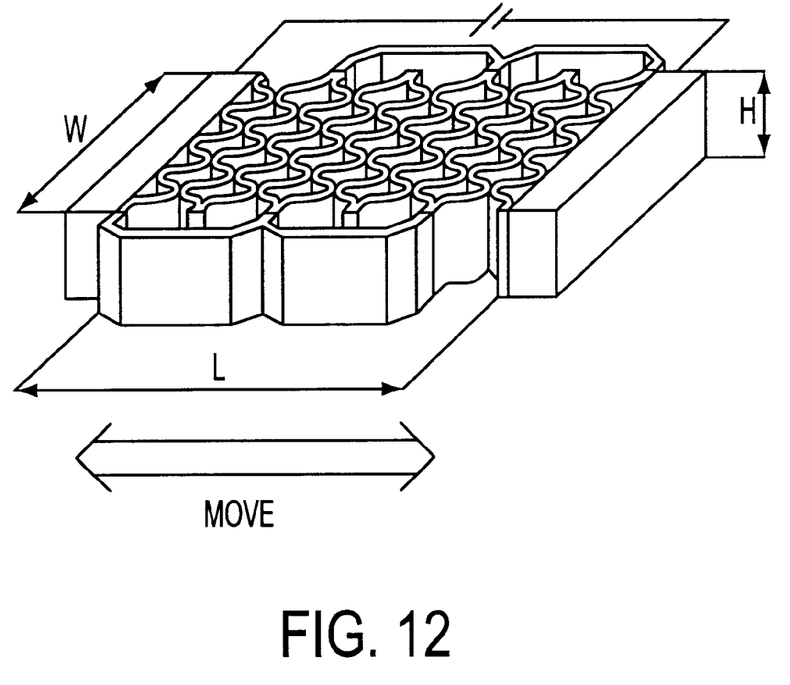
FIG. 12 is an isometric view of an embodiment of a MEMS motor for driving the embodiments of FIGS. 9–11.

Referring to FIG. 12, micro scale vibrations of very small structures may be achieved using MEMS technology. An example of a MEMS motor has an open structure with multiple cells. Each cell can be considered to be a driving unit As a voltage is applied across the cell, the electrodes are drawn together against the opposing force of the mechanical strength of an insulator-electrode multi layer. As the voltage is decreased, the restoring force generated by the mechanical strain causes the structure to return to its original configuration. Exciting the structure with an AC voltage source will cause vibration of the structure toward and away from the opposing side. Another type of motor that can be used to drive the embodiments discussed above is a piezo-electric transducer. This class of device can produce the motion required at frequencies up to 100 kHz and above.

As described above, this invention produces a scanning motion of diffraction limited spots on a surface at high speeds with low optical distortion with various advantages including lower cost of manufacture. Calculated beam deflection parameters of the invention are shown in Table 2.

TABLE 2

Calculated Beam Deflection Parameters of the Invention for Optical Scanning.

| Parameter | Vibrating OPWW Fiber |
|---|---|
| wavefront distortion | $\lambda/10$ at 0.55 $\mu$m (imaging lens limited) |
| area resolution (spots/line) | 100–1000 |
| cross-axis error | (depends on drive system-not yet determined) |
| speed (spot-widths/sec) | at least $2 \times 10^7$ |
| bandwidth | (fiber dependent) |
| scan efficiency | ~100% |

The invention design has the following advantages over the prior art:
1) It uses motion of a small structure with virtually no friction or wear to produce scanning of the spots on the surface, rather than motion of a mechanically mounted ensemble of several discrete optical components as in some prior art.
2) It may incorporate a MEMS drive that can be fabricated by processing steps similar to semiconductor lithography to replace the high-precision, mechanical servo systems required in some prior art with resulting savings in complexity, size, mass, assembly stages, alignment requirements, and cost.
3) It is intrinsically capable of very high scan speeds (e.g., using vibration frequencies above 100 kHz, depending on the mass of the element being oscillated and on the drive mechanism used) because of the low moving mass involved and the nature of the drive system.

The best MEMS scanning method depends on the practical engineering tradeoffs attending the specific application. For example, the mass of the moving element, the amplitude of the oscillation, and the frequency. One optimization goal might be to opt for high frequency and therefore favor minimum mass of the moving element. This would suggest an individual fiber is best. Engineering, however, places other constraints on the application, for example, the actual position of the surface emitting the light relative to the focal point of the optics. See for example, Brei et. al, incorporated herein by reference below.

Regarding the manufacturing of MEMS devices, for example, the light emitting aperture, shape and surface treatment, many solutions exist for manufacturing issues. For example methods have been developed to apply metals to glass fibers to enable capacitive coupling for driving the fiber motion. Individual methods of fabrication and then manufacture may be addressed depending on the availability of resources, e.g. metallization of a polymer "fiber" or waveguide, or application of piezoelectric material to a polymer. Regarding the optical properties of the fiber output, particularly with regard to numerical aperture (NA), some trial and error experimentation may be required to achieve an optimum configuration. If constructed layer by layer, the fiber tip construction is totally conventional. The optical quality and properties of the exit aperture as mentioned above are critical, and therefore exact recipes may require some trial and error experimentation. For example, a graded index clad may be necessary, or new process methods due to required design considerations. In embodiment employing an optical fiber, the exit aperture may be defined by cleaving. In embodiment employing a multilayer (e.g. polymer) structure, processing at the end of the fiber is important. Conventional methods at present include ion beam "polishing" of the tip or exit aperture. The above comments also apply to embodiments employing optoelectronic chips with embedded wave guides.

The cantilever "style" vibrating fiber structure requires a waveguiding "core," as with any optical fiber. Also a cladding is required to confine the optical energy. The fiber, or, more generally, light guide, can have a round, square, or rectangular cross section depending on design considerations for the purpose of light "piping." A square or rectangular cross section is easiest to deal with from a manufacturing and fabrication point of view, as well as from the point of view of driving oscillations. Planar "capacitive" plates are easily implemented in a layered, bimorph configuration that optimizes energy transfer for driving oscillation while minimizing the required power. However, this puts severe constraints on optical design due to the need for polarization conservation elsewhere in the system, as well as mode conservation and balance. A layer by layer fabrication process is the best approach; in that case, the "fixed end" of the fiber is on top of the underlying structural and functional layers. The quality checks necessary are both optical and mechanical. Longevity will be related to mechanical work, with frequency, total number of oscillations, material, composite structures, adhesion, etc. also being contributing factors.

Note, regarding a fundamental mechanism of failure in stressed single crystal materials, such as Si, defects in single crystals diffuse thermally and aggregate in the material. This is well known (see for example Silicon Processing for the VLSI Era, S. Wolf and R. N. Tauber, Lattice Press and other books addressing the processes in Si fabrication, particularly crystal growth).

The electro-optical switch and the optical railtap (directional coupler) are both components that have been developed in other integrated optics material systems (e.g. lithium niobate). They have also been developed in polymer-based integrated optics.

Note that various embodiments could make use of the same lasers for both reading and writing, as discussed above. In such a case, a head could have separate exit apertures for reading and for writing, or have one set of apertures serving both functions.

The respective entireties of the following United States patent applications, filed concurrently herewith, are hereby incorporated by reference in the present application:

Scanning Device Using Fiber Optic Bimorph (Adam Thomas Drobot, Robert Courtney White)

Multiple Channel Data Writing Device (Adam Thomas Drobot, Robert Courtney White, Newel Convers Wyeth, Albert Myron Green)

Multiple Channel Scanning Device Using Optoelectronic Switching (Adam Thomas Drobot, Robert Courtney White, Newel Convers Wyeth)

Method and Apparatus for Controlling the Focus of a Read/Write Head for an Optical Scanner (Edward Alan Phillips, Newel Convers Wyeth)

Multiple Channel Scanning Device Using Oversampling and Image Processing to Increase Throughput (Adam Thomas Drobot, Robert Courtney White, Newel Convers Wyeth, Albert Myron Green, Edward Alan Phillips)

The respective entireties of the following references are hereby incorporated by reference in the present application:

M. Ataka, A. Omodaka, N. Takeshima, and H. Fujita, "Fabrication and Operation of Polyimide Bimorph Actuators for a Ciliary Motion System", JMEMS, Volume 2, No. 4, page 146.

D. E. Brei and J. Blechschmidt, "Design and Static Modeling of a Semicircular Polymeric Piezoelectric Microactuator", JMEMS, Volume 1, No. 3, page 106.

J. W. Judy, R. S. Muller, and H. H. Zappe, "Magnetic Microactuation of Polysilicon Flexure Structures", JMEMS, Volume 4, No. 4, page 162.

T. S. Low and W. Guo, "Modeling of a Three-Layer Piezoelectric Bimorph Beam with Hysteresis", JMEMS.

Q. Meng, M. Mehregany, and R. L. Mullen, "Theoretical Modeling of Microfabricated Beams with Elastically Restrained Supports", JMEMS, Volume 2, No. 3, page 128 et. seq.

K. Minami, S. Kawamura, and M. Esashi, "Fabrication of Distributed Electrostatic Micro Actuator (DEMA)", JMEMS, Volume 2, No. 3, page 121 et. seq.

J. G. Smits, and A. Ballato, "Dynamic Admittance Matrix of Piezoelectric Cantilever Bimorphs", JMEMS, Volume 3, No. 3, page 105 et. seq.

Yuji Uenishi, Hedeno Tanaka, and Hiroo Ukita, NTT Interdisciplinary Research Laboratories (Tokyo, Japan), "AlGaAs/GaAs micromachining for monolithic integration of optical and mechanical components", Optical power driven cantilever resonator. Proceedings SPIE et. seq.

What is claimed is:

1. A scanning device for scanning a target surface, comprising:

a light-emitting base element with at least one internal light source and an array of output apertures from which light from said light source is emitted, said base element being movable with respect to a media element with a recorded surface;

said light-emitting base element being positioned with respect to said target surface so that light spots corresponding to said array of output apertures are projected onto said target surface;

a motor connected to drive said base element so that said output apertures are oscillated along a direction parallel to a line defined by an arrangement of said array.

2. A device as in claim 1, further comprising an optical focusing element arranged between said array of output apertures and said target surface to focus light from said array of output apertures onto said surface, whereby said light spots are formed on said target surface.

3. A device as in claim 2, wherein said focusing element has an approximately 1:1 magnification.

4. A device as in claim 1, further comprising a light detector positioned to detect light from said array of apertures and returned from said target surface.

5. A device as in claim 1, wherein said base element includes a plurality of optical fibers, each connected to a respective one of said array of output apertures.

6. A device as in claim 1, wherein:

said base element includes a plurality of optical fibers, each connected to a respective one of said array of output apertures; and said base element includes a plurality of detectors, each connected to receive light emitted by said respective one of said array of output apertures and returned from said target surface through said output aperture.

7. A device as in claim 6, wherein each of said plurality of detectors is connected to a respective one of plurality of optical fibers by an optical directional coupler such that said light returned through said respective output aperture is directed to said each of said plurality of detectors.

8. A device as in claim 7, further comprising an optical focusing element arranged between said array of output apertures and said target surface to focus light from said array of output apertures onto said surface, whereby said light spots are formed on said target surface.

9. A device as in claim 8, wherein said focusing element has an approximately 1:1 magnification.

10. A device as in claim 1, further comprising:

an optical focusing element arranged between said array of output apertures and said target surface to focus light from said array of output apertures onto said surface, whereby said light spots are formed on said target surface;

said optical focusing element and said base element being fixedly interconnected such that said optical focusing element is oscillated with said base element by said motor.

11. A scanning device for scanning a target surface, comprising:

a light-emitting base element with at least one internal light source and an array of output apertures from which light from said light source is emitted;

an optical focusing element arranged between said array of output apertures and said target surface to focus light from said array of output apertures onto said surface, whereby a corresponding array of light spots are imaged on said target surface;

a motor connected to drive at least one of said base element and said optical focusing element relative to said target surface so that said array of light spots is oscillated along a direction parallel to a line defined by an arrangement of said array of light spots.

12. A device as in claim 11, wherein said focusing element has an approximately 1:1 magnification.

13. A device as in claim 11, further comprising a light detector positioned to detect light from said array of apertures and returned from said target surface.

14. A device as in claim 11, wherein said base element includes a plurality of optical fibers, each connected to a respective one of said array of output apertures.

15. A device as in claim 11, wherein:
said base element includes a plurality of optical fibers, each connected to a respective one of said array of output apertures; and
said base element includes a plurality of detectors, each connected to receive light emitted by said respective one of said array of output apertures and returned from said target surface through said output aperture.

16. A device as in claim 15, wherein each of said plurality of detectors is connected to a respective one of plurality of optical fibers by an optical directional coupler such that said light returned through said respective output aperture is directed to said each of said plurality of detectors.

17. A device as in claim 11, wherein said optical focusing element and said base element are fixedly interconnected such that said optical focusing element is oscillated with said base element by said motor.

* * * * *